(12) United States Patent
Davis

(10) Patent No.: US 11,565,843 B2
(45) Date of Patent: Jan. 31, 2023

(54) FORM FILL SEAL SYSTEM WITH MULTIPLE FILLING MODES

(71) Applicant: Winpak Lane, Inc., San Bernardino, CA (US)

(72) Inventor: Steven Davis, San Bernardino, CA (US)

(73) Assignee: WINPAK LANE, INC., Rialto, CA (US)

( * ) Notice: Subject to any disclaimer, the term of this patent is extended or adjusted under 35 U.S.C. 154(b) by 132 days.

(21) Appl. No.: 17/025,935

(22) Filed: Sep. 18, 2020

(65) Prior Publication Data

US 2021/0086935 A1 Mar. 25, 2021

Related U.S. Application Data

(60) Provisional application No. 62/903,830, filed on Sep. 21, 2019.

(51) Int. Cl.
| | | |
|---|---|---|
| *B65B 57/14* | (2006.01) | |
| *B65B 9/213* | (2012.01) | |
| *B65B 9/20* | (2012.01) | |
| *B65B 3/12* | (2006.01) | |
| *B65B 3/26* | (2006.01) | |
| *B65B 9/12* | (2006.01) | |

(52) U.S. Cl.
CPC .............. *B65B 57/145* (2013.01); *B65B 3/12* (2013.01); *B65B 3/26* (2013.01); *B65B 9/12* (2013.01); *B65B 9/2007* (2013.01); *B65B 9/2042* (2013.01); *B65B 9/2049* (2013.01); *B65B 9/213* (2013.01)

(58) Field of Classification Search
CPC .... B65B 3/12; B65B 3/26; B65B 9/12; B65B 9/2007; B65B 9/2042; B65B 9/2049; B65B 9/207; B65B 9/213; B65B 51/225; B65B 57/145
USPC ..................................................... 53/451, 551
See application file for complete search history.

(56) References Cited

U.S. PATENT DOCUMENTS

| | | | | |
|---|---|---|---|---|
| 3,071,907 A | * | 1/1963 | Jarund .................... | B65B 9/213 53/550 |
| 3,831,821 A | * | 8/1974 | Doyen ..................... | B65B 3/32 53/451 |
| 4,887,411 A | * | 12/1989 | Rondeau et al. ....... | B65B 9/213 53/284.7 |
| 5,113,635 A | * | 5/1992 | Takai et al. ............. | B65B 9/207 53/52 |

(Continued)

FOREIGN PATENT DOCUMENTS

| | | | | |
|---|---|---|---|---|
| DE | 102009040496 A1 | * | 3/2011 | ............... B65B 3/12 |
| WO | WO-2006080164 A1 | * | 8/2006 | ............. B65B 9/207 |

*Primary Examiner* — Stephen F. Gerrity
(74) *Attorney, Agent, or Firm* — The Watson IP Group, PLC; Jovan N. Jovanovic

(57) ABSTRACT

A form fill seal apparatus for forming and filling a plurality of bags with a product having a tube formation assembly forming a tubular film, a bag forming assembly configured to form transverse seals and to cut the tubular film to form bags. A product delivery system is provided to deliver product from a positive displacement pump to a product delivery tube. A control system is structurally configured to direct the positive displacement pump to operate in two different modes, a first, continuous operating mode and a second, dosing operating mode. A method of filling is likewise disclosed.

8 Claims, 9 Drawing Sheets

(56) References Cited

U.S. PATENT DOCUMENTS

| | | | | |
|---|---|---|---|---|
| 5,231,817 | A * | 8/1993 | Sadler | B65B 9/12 |
| | | | | 53/552 |
| 6,374,572 | B1 * | 4/2002 | Honma et al. | B65B 9/207 |
| | | | | 53/64 |
| 7,128,935 | B2 * | 10/2006 | Germick et al. | B65B 9/2028 |
| | | | | 141/105 |
| 7,546,722 | B2 * | 6/2009 | Tsuruta | B65B 9/20 |
| | | | | 53/551 |
| 7,779,612 | B2 * | 8/2010 | Fergusson et al. | B65B 9/213 |
| | | | | 53/551 |
| 2015/0030492 | A1 * | 1/2015 | Montie et al. | F01C 21/106 |
| | | | | 418/260 |
| 2018/0265231 | A1 * | 9/2018 | Caudle et al. | B65B 9/2007 |
| 2020/0115090 | A1 * | 4/2020 | Bean et al. | B65B 9/207 |

* cited by examiner

FORM FILL SEAL SYSTEM WITH MULTIPLE FILLING MODES

CROSS-REFERENCE TO RELATED APPLICATION

This application claims priority from U.S. Provisional Patent Application Ser. No. 62/903,830 filed Sep. 21, 2019, entitled Form Fill Seal System With Multiple Filling Modes, the entire specification of which is hereby incorporated by reference in its entirety.

BACKGROUND OF THE DISCLOSURE

1. Field of the Disclosure

The disclosure relates in general to filling equipment, and more particularly, to a form fill seal apparatus that has multiple filling modes, including a continuous filling mode and a dosing filling mode.

2. Background Art

The use of form fill seal apparatuses as a method used to fill bags with product has been known in the art for many years. Generally, a film is provided and within the apparatus is manipulated into a tube and a longitudinal seal is formed to complete the tube. A product fill tube is located inside the apparatus, which introduces product into the tube. A cross seal is formed in the tube to form the bottom seal of a bag. As the tube is filled, eventually another seal is formed, which forms the upper seal of a now formed bag and the lower seal of the subsequent to be formed bag.

Typically, product is dispensed continuously, and bags are formed continuously or in an indexed manner. A squeegee system can be employed to drive product away from the portions of the bag where the seal will be formed. The squeegee system typically provides sufficient abutment of surfaces free of product so as to effectively create a seal.

Problematically, some product is generally not fully compatible with the squeegee system and it becomes hard to eliminate or sufficiently eliminate contamination of the region to be sealed by the product. One such product is blue cheese. Typically, blue cheese cannot be removed from between films through a squeegee as blue cheese appears to smear rather than be forced out from between two films. Therefore, when the seal is created to form the bag, such product remains in the region where the seal is formed. In many instances, the remaining product severely compromises the strength of the seal (and leading in, at least some instances, to failure), may lead to the product being burned, discolored or otherwise adversely affected.

In some instances, seals have been increased in size in an effort to enhance the seal and in the hopes of creating a seal that is usable. In other instances, completely different equipment is utilized for such products. In other instances, the increased defect rate becomes part of the process. In each instance, complexity or cost are undesirably increased.

SUMMARY OF THE DISCLOSURE

The disclosure is directed to a form fill seal apparatus for forming and filling a plurality of bags with a product. The form fill seal apparatus comprises a tube formation assembly, a bag forming assembly and a product delivery assembly. The tube formation assembly has a contact former and a forming tube extending downstream of the contact former and structurally configured to manipulate a polymer film into a tubular configuration with at least one longitudinal seal forming a tubular film, and a film directing structure to direct the tubular film through the apparatus. The bag forming assembly includes a film sealing assembly structurally configured to form a transverse seal and including a cutter to cut through the film upon formation of a transverse seal, and with a pair of opposing squeegee rollers configured to sandwich the tubular film (and squeeze out contents therebetween).

The product delivery assembly has a positive displacement pump, a product delivery tube and a coupling tube. The positive displacement pump has an inlet and an outlet. The inlet is structurally configured to be attachable to a supply of the product. The product delivery tube extends through the tube formation assembly, with an outlet at a second end thereof. The coupling tube has a first end coupled to the outlet of the positive displacement pump and a second end coupled to a first end of the product delivery tube.

The positive displacement pump is structurally configured to operate in a continuous operating mode and a dosing operating mode. In the continuous operating mode, the positive displacement pump continuously supplies product to the product delivery tube and through the second end thereof. In a dosing operating mode the positive displacement pump supplies a predetermined volume of product to the product delivery tube.

In some configurations, the positive displacement pump comprises a rotary lobe pump, having a electronic cam drive operational in the dosing operating mode.

In some configurations, the positive displacement pump has a sinusoidal speed profile. This profile reduces the impact of product contacting the hot seal area.

In some configurations, the positive displacement pump has a plurality of speeds in the continuous operating mode.

In some configurations, the opposing squeegee rollers remain separated from each other in the dosing operating mode. In this case a mechanical bag deflator composed of two flat structures are used to remove excess air.

In some configurations, the product delivery tube further includes a plunger selectively movable by the control system to selectively seal the second end, to, in turn, preclude the passage of product therethrough.

In some configurations, the film directing structure further includes rollers that are positioned to direct the tubular film through the tube formation assembly and to flatten the tubular film. The rollers including two spaced apart rollers on opposing sides of the forming tube.

In another aspect of the disclosure, the disclosure is directed to a method of filling a bag with a product utilizing a form fill seal apparatus. The method comprises the steps of: providing a film comprising a polymer; manipulating the film into a tubular configuration; forming a longitudinal seal on the tubular configuration to form a tubular film; directing product through a positive displacement pump to a product delivery tube in communication with the tubular film through one of a continuous operating mode and a dosing operating mode; sequentially forming a plurality of transverse seals after directing a predetermined amount of product into the tubular film; and cutting the tubular film after forming a pair of transverse seals with product between the seals to form a bag.

In some configurations, the method further comprises the step of: directing opposing squeegee rollers into contact with the tubular film sandwiching the tubular film therebetween after the step of directing product; and moving the tubular film past the squeegee rollers to displace product with the tubular film prior to the step of sequentially forming a plurality of transverse seals.

In some configurations, the steps of directing and moving product occur only when the positive displacement pump is in a continuous operating mode.

In some configurations, in the continuous operating mode, the positive displacement pump has a plurality of speeds.

In some configurations, in the dosing operating mode, the directing of product is based upon volume. In some configurations, squeegee rollers can be used to control the headspace in the package.

In some configurations, the transverse seals are formed through any one of heat seals, RF welding and ultrasonic welding.

In some configurations, the dosing operating mode, the positive displacement pump has a sinusoidal speed profile, or other speed profile as determined by, for example, a cam, or, for example, electronically.

BRIEF DESCRIPTION OF THE DRAWINGS

The disclosure will now be described with reference to the drawings wherein.

DETAILED DESCRIPTION OF THE DISCLOSURE

Figure 1:
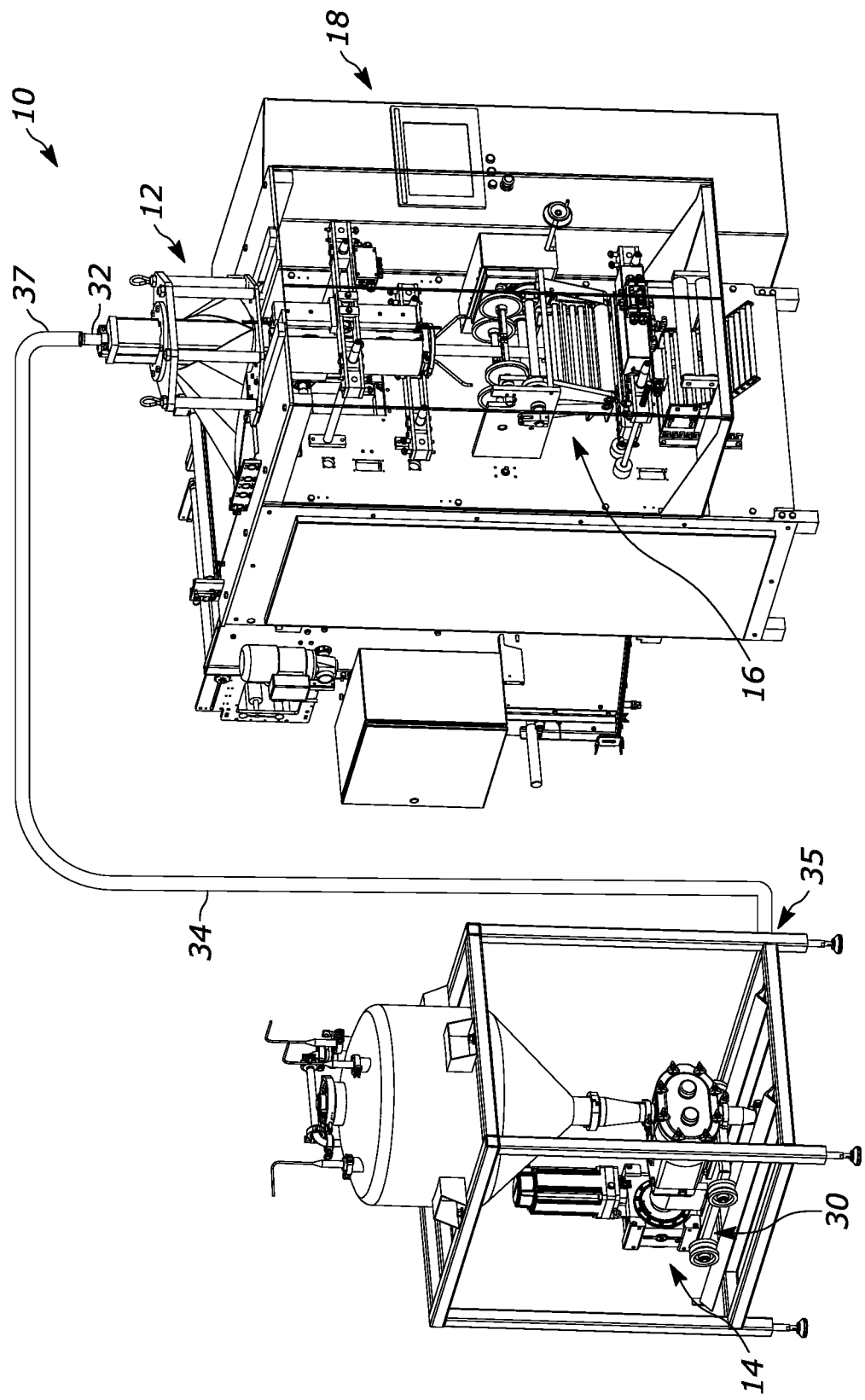
FIG. 1 of the drawings is a perspective view of the form fill seal apparatus of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the form fill seal apparatus having multiple modes is shown generally at 10. The form fill seal (FFS) apparatus includes tube formation assembly 12, product delivery assembly 14, bag forming assembly 16, and control system 18. For example, the FFS apparatus can be used to form and fill variously sized bags with different types of product, including, but not limited to liquids, pastes, dressings, suspensions, gels to semi-solids, condiments, among others. Generally, the product is flowable so as to be directable through the apparatus. As described hereinbelow, the control system operates such that the apparatus can be utilized in two different modes, a continuous fill mode and a dosing fill mode so that packages can be filled in two different and distinct manners, depending on, for example, the product being filled.

Figure 9A:
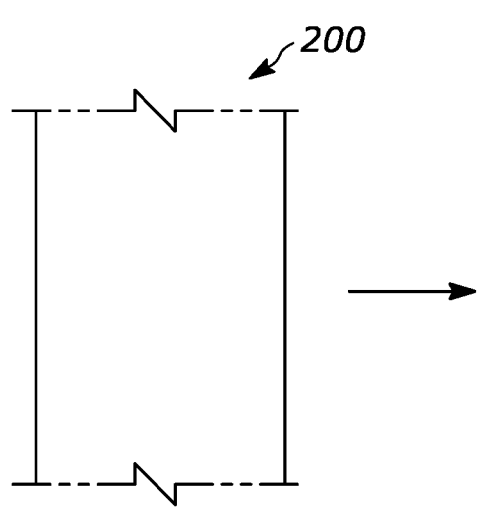
FIGS. 9a through 9c is a plurality of schematic views of the film, shown as a planar film, the tubular film and the flattened tubular film.
Figure 9B:
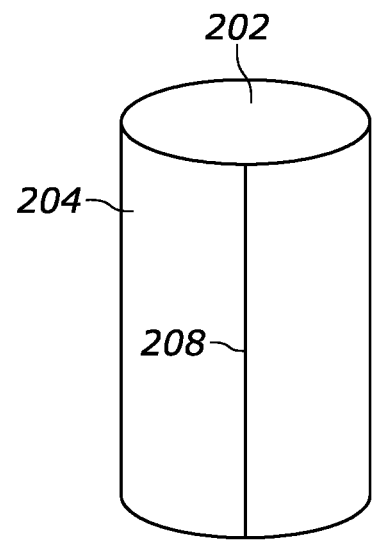
Figure 9C:
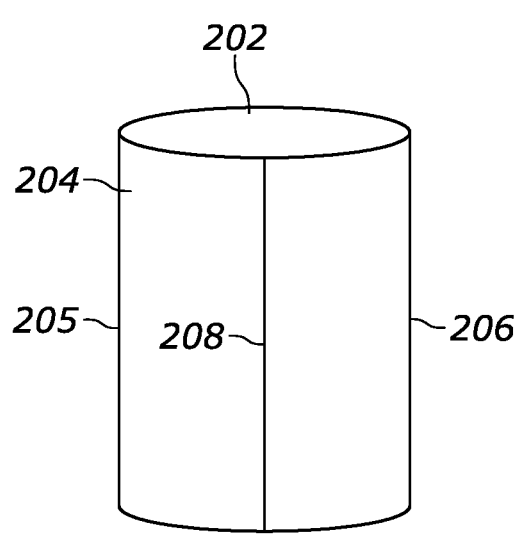

An exemplary form fill seal film and bag are shown in FIGS. 9a-9c as comprising film 200 (see, FIGS. 4 and 10) which typically is shipped and utilized by the equipment in large rolls. The film 200 comprises a polymer film that may be formed from a lamination or a co-extrusion of a plurality of layers, and may include other features, such as barrier structures which are incorporated. The disclosure is not limited to the use of any particular type of film or film structure. The film 200 includes an inner surface 202 and an outer surface 204, with opposing side edges 205 and 206. As will be explained, when the film enters into the system, the film is manipulated into a tube formation and the opposing side edges are sealed to each other (or to other portions of the film so as to create a tube (or multiple tubes). In the configuration shown, the tubular shape is formed defining a longitudinal seal 208.

Figure 10:
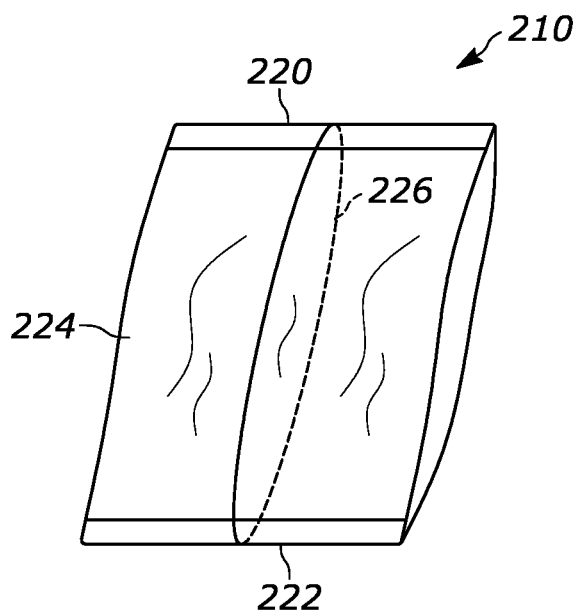
FIG. 10 of the drawings is a completed bag filled with product.

Additionally, as will be explained below, and with reference FIG. 10, the end result is the formation of filled bags, such as bag 201, wherein the bags are formed from the tubular shape, through the formation of an upper seal 220, a lower seal 222 wherein the film and the seals define a front panel 224, a back panel 226. The longitudinal seal 208, in the bag shown, bisects the back panel from the upper seal to the lower seal. Of course, a number of bag formations (heights, widths, volumes, among other characteristics) are contemplated, and the bag formation is not limited to that which is disclosed.

The tube formation assembly 12 is shown in FIGS. 1, and 3 through 5, as comprising contact former 20, forming tube 22, tubular sealer 24 and film directing structure 26. The contact former manipulates the otherwise generally planar film into a tubular format. Such formers are known in the art, by way of, for example, U.S. Pat. No. D399,512 issued to Davis et al and U.S. Pat. No. 6,006,501 issued to Davis et al, the entire disclosure of which is hereby incorporated by reference in its entirety.

Figure 4:
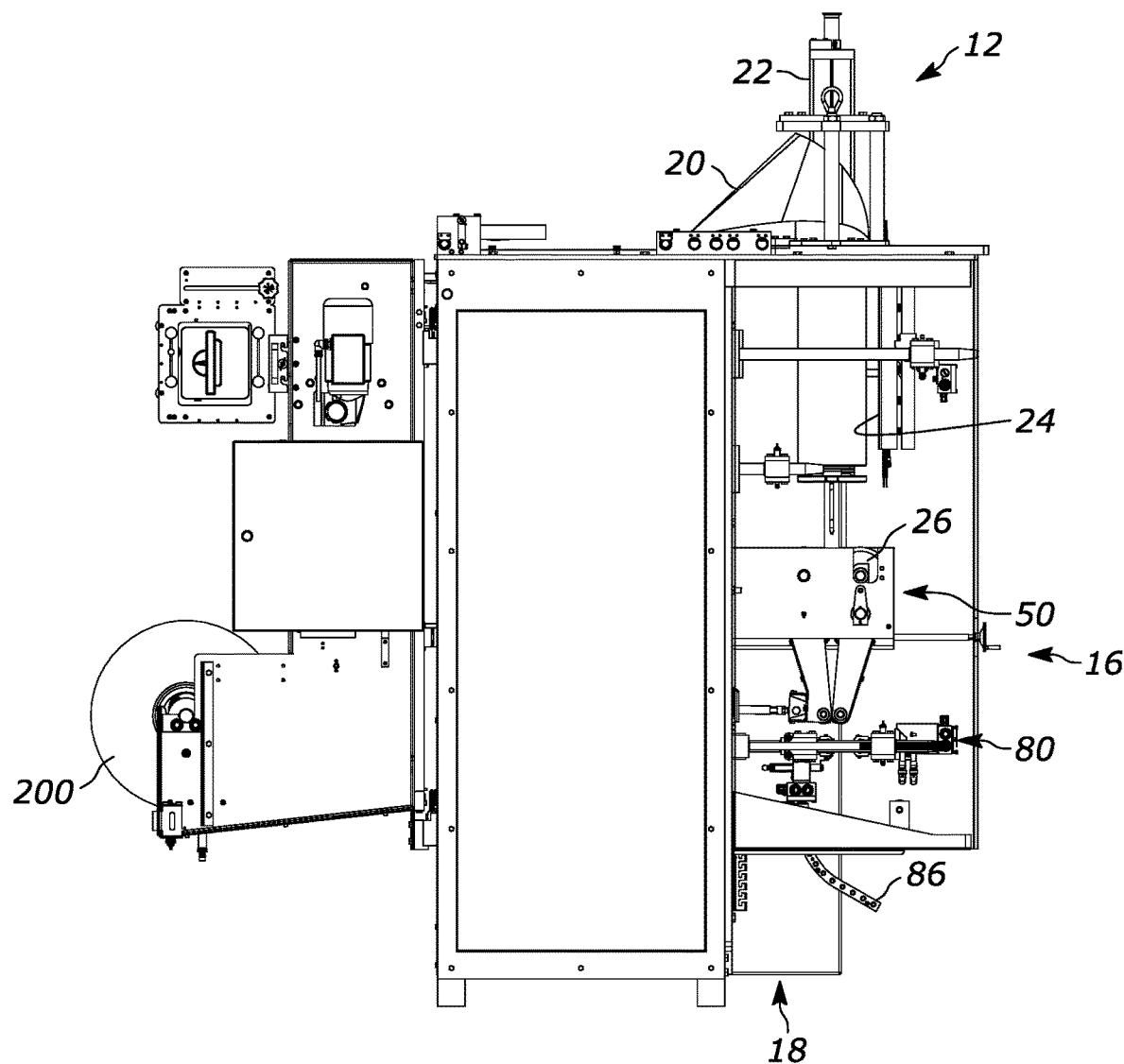
FIG. 4 of the drawings is a side elevational view of the tubular formation assembly and the bag forming assembly.

The forming tube provides a backdrop for the film when manipulated into the tube formation, and, provides an inner support surface for formation of the longitudinal seal 208 (FIG. 10) by the tubular sealer 24 (FIG. 4). A number of different sealing systems are contemplated to join the film into a tubular format, such as, for example, heat sealing, RF sealing, ultrasonic sealing, among others.

Figure 5:
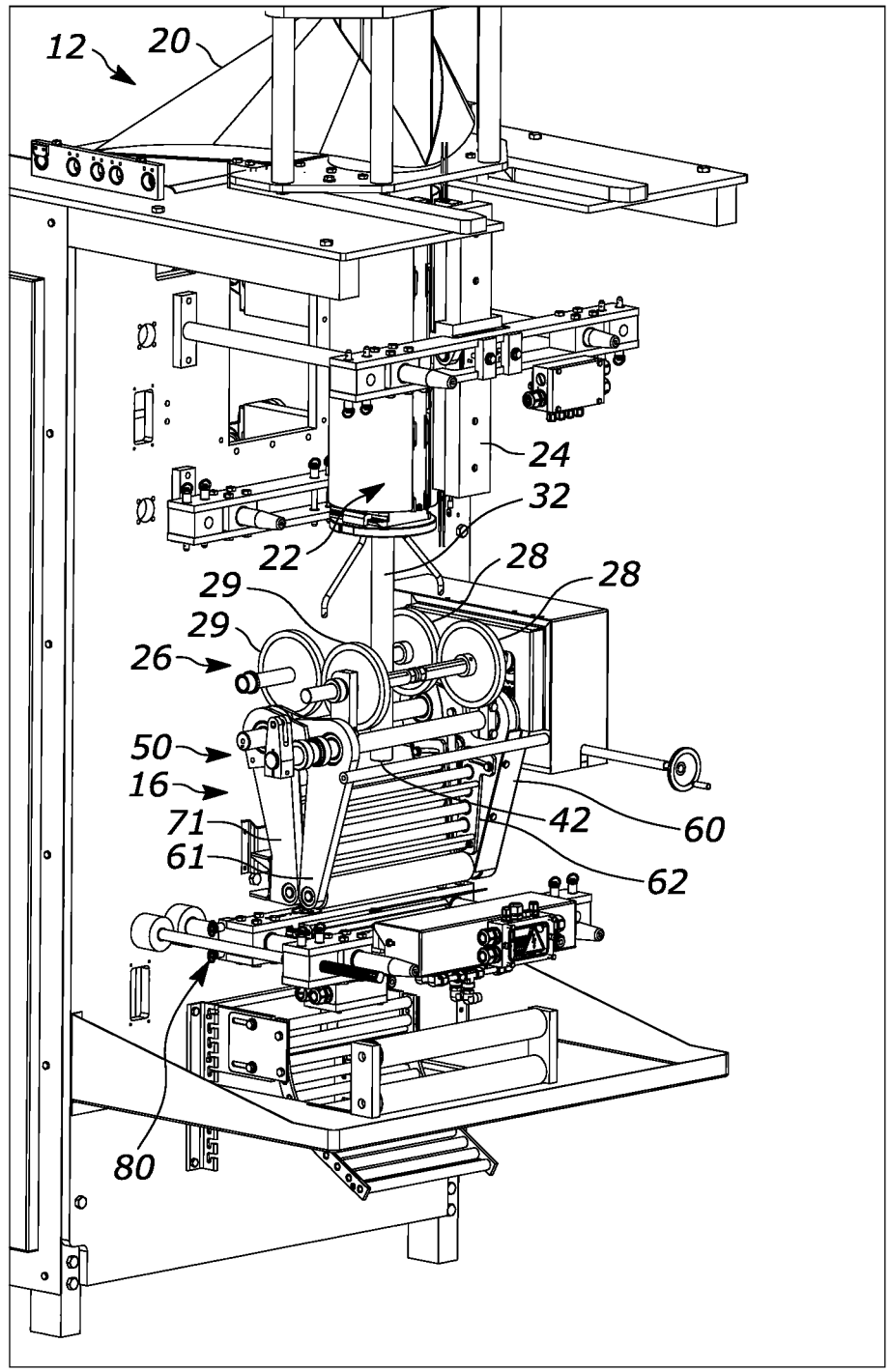
FIG. 5 of the drawings is a partial perspective view of the tubular formation assembly and the bag forming assembly, the bag shaping assembly and the film sealing assembly.

With reference to FIG. 4, the film directing structure 26 is structurally configured to direct the film through at least one of the formation of the tube, the filling of the tube and the sealing to form a bag. It will be understood that, typically, the film is pulled through the tube formation assembly in various different manners. In some configurations, a friction pulling configuration works against the film and the forming tube to direct material through the FFS apparatus. In the configuration shown, the film directing structure 26 alters the shape of the tube from a generally cylindrical cross-sectional configuration to a flattened configuration defining a front panel and a rear panel by pinching each to form opposing edges within rollers 28, 29 (FIG. 5). The rollers (at least some of the rollers) are coupled to a motive force, such as a servomotor or the like to advance and control the movement of the rollers, and the passage of the film through the tube formation assembly.

Figure 2:
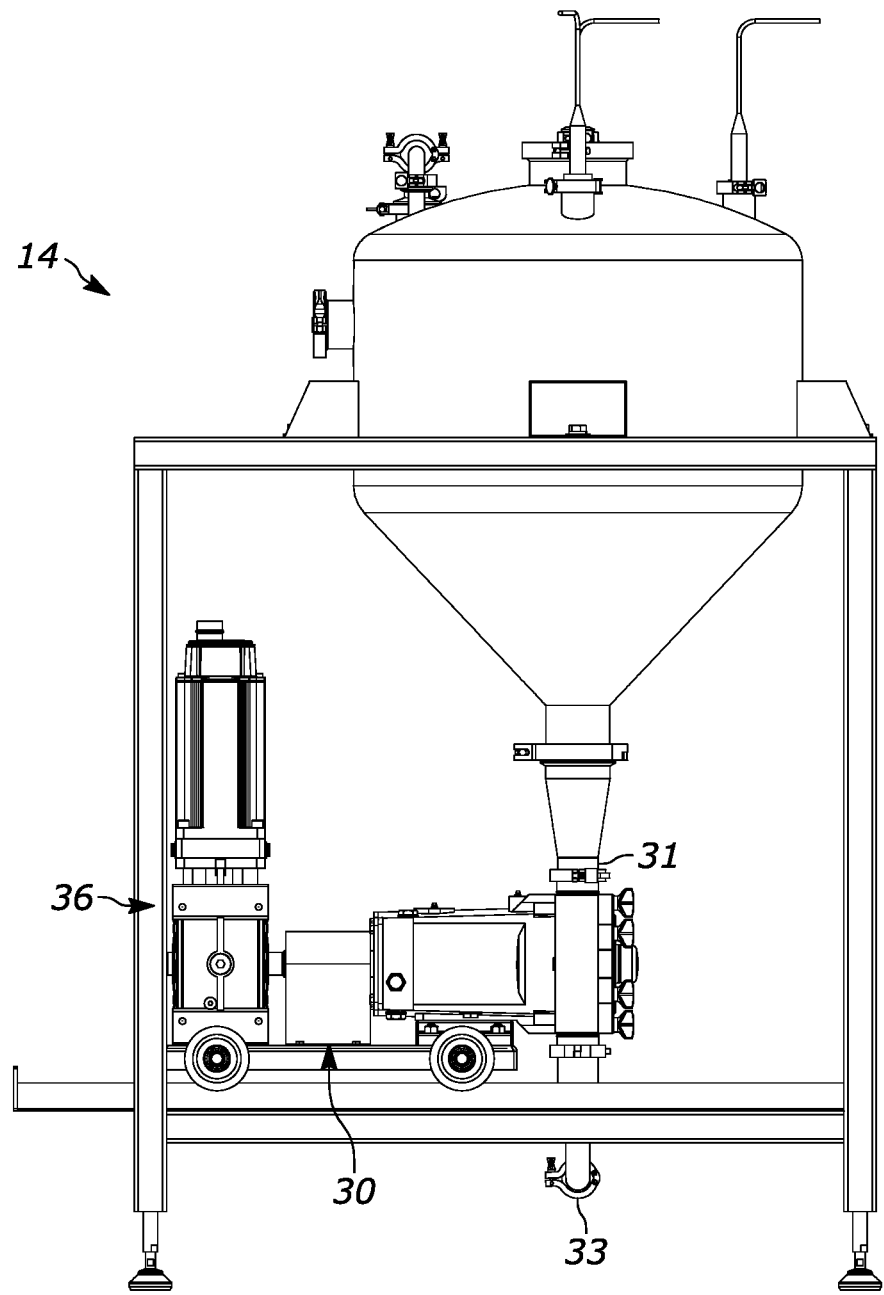
FIG. 2 of the drawings is a side elevational view of the product delivery assembly of the present disclosure, showing, in particular, the positive displacement pump.
Figure 3:
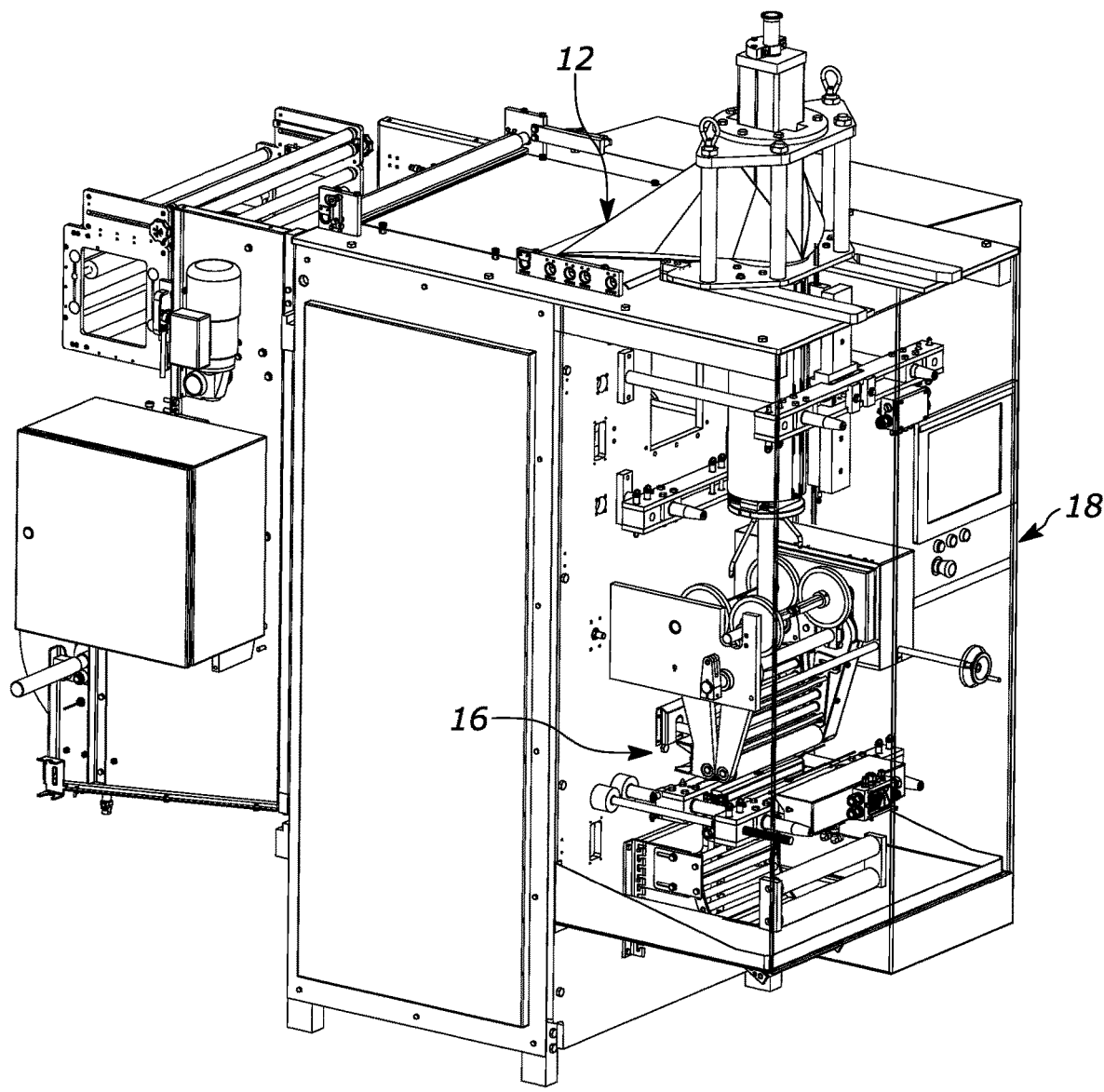
FIG. 3 of the drawings is a perspective view of the tubular formation assembly, the bag forming assembly and the control system.

The product delivery assembly 14 is shown in FIGS. 1 and 2 and structurally configured to drive or otherwise direct product from storage tanks or the like to the FFS apparatus, and eventually into the film which will then be closed and cut to form the bag. The product delivery assembly 14 includes positive displacement pump 30, product delivery tube 32 and coupling tube 34. The positive displacement pump 30 comprises a pump that includes an inlet 31 and outlet 33, and, a drive 36 which is capable of delivering variable speeds. Although a number of different pumps are contemplated, it is contemplated that the pumps may comprise a Waukesha 30 available from SPX Process Equipment of Delvan, Wis. or a Masosine Certa 300 from Watson-Marlow Fluid Technology Group of Wilmington Mass. It will be understood that these are solely exemplary and not to be deemed limiting. The positive displacement pump, as will be explained can operate in multiple modes. In a first mode, a continuous, or substantially continuous mode, a plurality of speeds is are contemplated. In the configuration shown, two different speeds are contemplated a relatively slower speed and a relatively higher speed (in other configurations, the substantially continuous mode may comprise a single speed or a continuously variable speeds). For example, the relatively higher speed can be utilized to fill the bulk of the tube/bag quickly while the relatively lower speed can be utilized to slow the pump as the product is filled, to allow for the bag film to be moved within the system, for example, when the bag is to be sealed and cut from the tubular film.

In a second mode, a dosing fill is contemplated, through the use of a cam profile. The cam profile controls the rotational speed of the rotary piston pump in a variable speed profile (for example, a sinusoidal speed profile). Advantageously, the seals are generally not contaminated by products that the squeegee cannot remove. Second, the speed profile allows for relatively close weight control.

With reference to FIGS. 4 through 6 and 8, the product delivery tube 32 generally comprises the inner cavity of the forming tube 22, or, is positioned within the forming tube 22 when they are separate components (such as, for example, a tube within a tube). The product delivery tube includes first end 40 and second end 42 and inner cavity 44, and comprises a generally elongated tube having a substantially circular cross-sectional configuration. The first end 40 is proximate the contact former 20 with the second end 42 being spaced distally therefrom, and, for example, close or proximate the film sealing assembly. A plunger 46 may be positioned proximate the second end to provide a physical stop for the product within the product delivery tube. In the configuration shown, the plunger can be controlled by way of an actuator, such as actuator 46. It will further be understood that the plunger can be fully removed in certain configurations, such as, for example, the configuration that has continuous flow of product. In other configurations, the plunger can be maintained in any operation and, for the continuous flow configuration, that can be maintained in the open configuration.

The coupling tube 34 comprises a generally rigid or flexible elongated tubular member having a first end 35 and a second end 37. The first end 35 is coupled to the outlet 33 of the positive displacement pump so as to be in fluid communication therewith. The second end 37 is coupled to the first end 40 of the product delivery tube 32 and in fluid communication therewith. It will be understood that the coupling tube and the product delivery tube are substantially of a generally constant volume such that based on the duration and speed of the positive displacement motor, the amount of product that exits the product delivery assembly can be controlled relatively closely so that in the dosing configuration, the dosing can be controlled so as to insure repeatability. In some instances, the coupling tube comprises a plurality of attached (or a single) stainless steel, food grade tubular member. Other types of structures are contemplated as well, including, for example other food grade tubular members.

Figure 6:
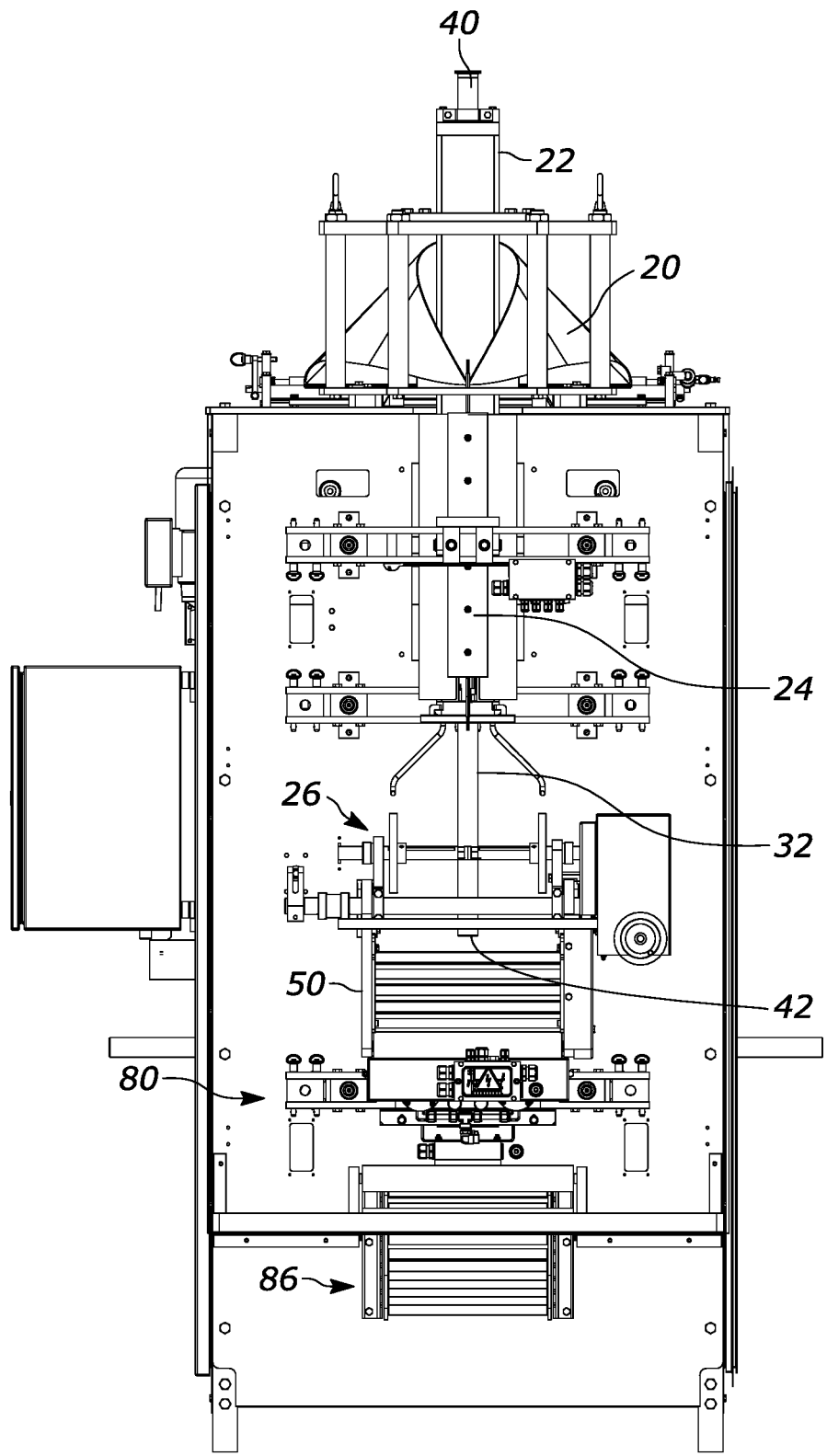
FIG. 6 of the drawings is a front elevational view of the tubular formation assembly, the bag forming assembly and the bag shaping assembly, as well as the conveyor.
Figure 7:
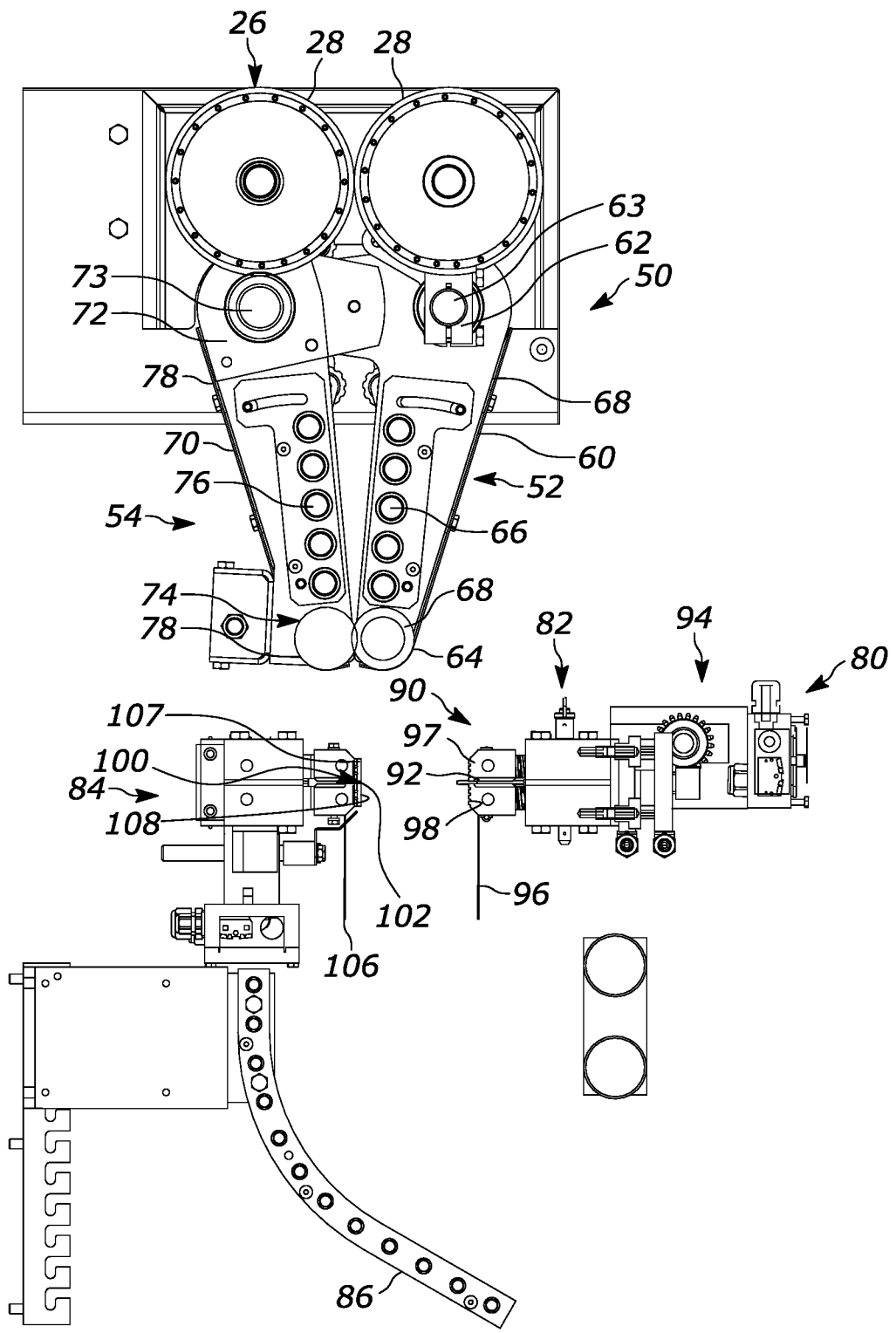
FIG. 7 of the drawings is a partial cross-sectional view of the bag forming assembly, showing, in particular, the bag shaping assembly, the film sealing assembly and the conveyor.
Figure 8:
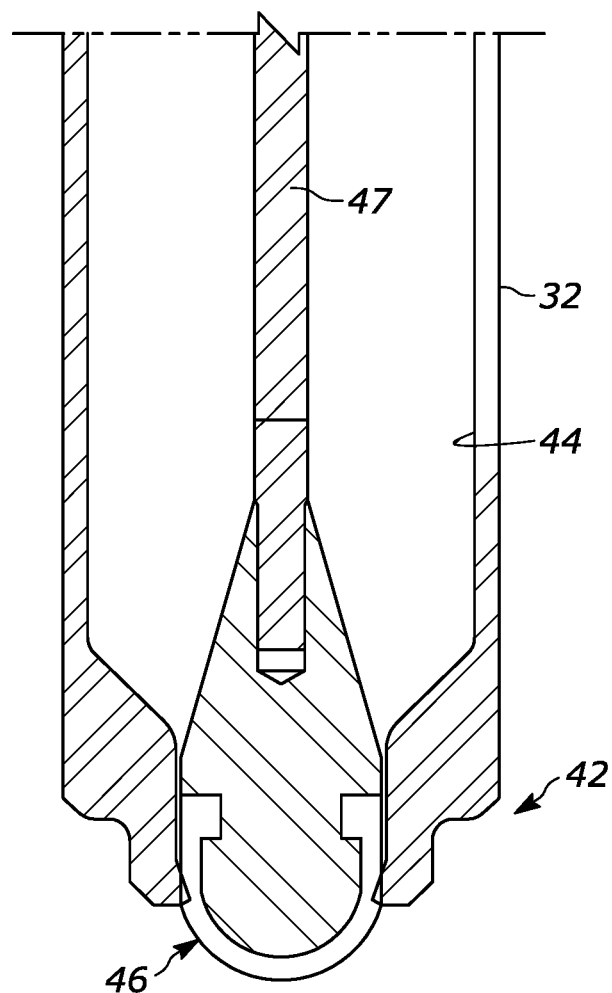
FIG. 8 of the drawings is a partial cross-sectional view of the product delivery tube of the present disclosure showing the inner cavity, the plunger and the actuator thereof.

The bag forming assembly 16 is shown in FIGS. 5 through 7 as including bag shaping assembly 50, film sealing assembly 80 and conveyor 86. The bag shaping assembly comprises a pair of assemblies that are positioned on opposite sides of each other that can sandwich the tubular film therebetween as the tubular film is filled (after the formation of the lower seal of the bag, which, in most configurations, is the upper seal of the previous bag). In the configuration shown, the bag shaping assembly 50 comprises outboard assembly 52 and inboard assembly 54. The outboard assembly 52 includes two spaced apart lever arms 60, 61 that are spaced apart from each other, and preferably having the film therebetween. The lever arms are generally mirror images of each other, and each include a pivot end 62 and distal end 64. The lever arms generally pivot about axis 63 that extends generally perpendicular to the lever arms and generally perpendicular to the flow of the film through the FFS apparatus. A plurality of cross rollers, such as cross-roller 66 extends between the lever arms 60, 61. A squeegee roller 68 is positioned proximate the distal end 64 of the lever arms 60, 61. In the configuration shown, the squeegee roller can be powered by a chain and sprocket configuration coupled to a servomotor or the like. The servomotor can be controlled by the control system 18.

The inboard assembly 54 is substantially identical and a substantial mirror image of the outboard assembly. As such, the inboard assembly includes lever arms 70, 71 which rotate about axis of rotation 73. Each of the lever arms includes pivot end 72 and distal end 74. Cross rollers 76 extend between the lever arms, and a squeegee roller 78 extends between the two lever arms 70, 71 proximate the distal end thereof. The cross roller 76 can likewise be driven by a common or separate servomotor through a chain and sprocket configuration.

It will be understood that the lever arms of the inboard assembly and the outboard assembly can be pivoted to drive the squeegee roller 68 and the squeegee roller 78 into each other. The squeegee rollers can be used to direct the bag without allowing material to be between the front panel and back panel of the forming bag. The cross rollers provide some level of structural support to the tubular film so as to provide some volumetric control and shaping ability to the resulting bag while being filled.

The film sealing assembly 80 comprises first side mating sealer 82 and second side mating sealer 84. The first side mating sealer 82 and the second side mating sealer 84 which is on the opposite side of the first side mating sealer. In the configuration shown, the first side mating sealer is downstream of the outboard assembly 52 and the second side mating sealer is downstream of the inboard assembly 54.

The first side mating sealer 82 comprises seal contact surface 90, central cutter 92, displacement assembly 94 and shaping surface 96. The seal contact surface 90 includes upper portion 97 and lower portion 98. In the configuration shown, the central cutter 92 is positioned between the upper portion and the lower portion and may comprise a blade that can either move across the film, or can be directed at the film to cut through tubular film between seals. In the configuration shown, the seal contact surface and the central cutter are generally perpendicular to the flow of the film through the FFS apparatus.

The displacement assembly 94 is configured to displace the seal contact surface toward the film in a generally perpendicular direction relative to the flow of the film through the FFS apparatus. In the configuration shown, the displacement assembly 94 comprises an air or hydraulic cylinder, while other structures are likewise contemplated for use.

The shaping surface comprises a generally planar surface that is positioned downstream of the seal contact surface 90 and which is coupled thereto so as to be displaced inwardly and outwardly together with the seal contact surface.

The second side mating sealer 84 is substantially a mirror image of the first side mating sealer 82, so as to be substantially complementary thereto. The second side mating sealer 84 includes seal contact surface 100, central cutter receiver 102 and shaping surface 106. The seal contact surface 100 includes upper portion 107 and lower portion 108 both of which are opposite upper portion 97 and upper portion 98 of the seal contact surface 90. The central cutter receiver 102 is configured to either receive the blade of the central cutter 92 or to provide a surface upon which the cutter can operate. In other configurations, the central cutter receiver can be replaced with another cutter so that cutters are positioned on opposing sides of each other either offset from each other or in contact with each other.

Shaping surface 106 likewise comprises a generally planar surface that is positioned downstream of the seal contact surface 100 and which is coupled thereto so as to be displaced inwardly and outwardly together with the seal contact surface. In the configuration shown, the shaping surfaces 96 and 106 can be parallel to each other, or can be positioned so as to be mirror images of each other (wherein, for example the lower ends thereof are closer to each other than the upper ends thereof).

It will be understood that the first side mating sealer 82 and the second side mating sealer 84 can be directed to each other so as to sandwich the tubular film therebetween and to force the inner surfaces of the opposing formed panels into contact with each other. The upper and lower portions of the seal contact surface of one or both of the first side mating sealer and the second side mating sealer may include configurations that can seal the opposing sides of the flattened tubular member through joining. Such structures may comprise heated surfaces that can form a heat seal, RF sealing structures and/or ultrasonic sealing structures, among others.

It will be understood that the cutter can cut between the formed upper seal portion and lower seal portion (one of which forms the upper seal of the formed bag and one that forms the lower seal of the subsequent bag).

The conveyor 86 is positioned downstream of the film sealing assembly and is configured to receive the formed and filled bag and to direct the same away from the filling and sealing portions of the FFS apparatus for handling, and other post processing.

The control system 18 comprises a computing device that includes a processor, volatile or non-volatile memory and i/o capabilities. Such industrial controllers are available from a number of different suppliers and manufacturers, and, are readily known to those of skill in the art. The control system 18 may be coupled to the plunger, the film delivery assembly, bag forming and shaping assembly, the bag sealing system and pump system to control the movement of the same. Additionally, a number of sensors and the like may also be coupled to the computing device so as to provide information as to the position, orientation and movement of the film, bags, product and various components of the overall process.

The operation of the apparatus will be described with respect to the continuous operating mode first and subsequently with respect to the dosing operating mode. It will further be understood that in either mode, variations are contemplated to the operation.

In the continuous operating mode, once the operation has been started and the film has been loaded into the FFS equipment and threaded through the system to and, possibly, beyond the film sealing assembly. Additionally, product (from, for example, a separate tank or the like) is in communication with the positive displacement pump of the product delivery assembly 14 so that the product can be directed to the FFS apparatus.

Once set up, a seal is created in the tubular film by the film sealing assembly so as to form the bottom seal of a bag which generally comprises a transverse seal, or a seal that is substantially transverse to the direction of movement of the tubular film through the apparatus. The system can then be activated. Once activated, the opposing outward and inward assemblies 52, 54 are brought toward each other, without the squeegee rollers 68, 78 into contact with each other (preferably). As the bag is filled, the bag expands to contact the cross rollers which provide a framework or structure to the bag, to aid in shaping the bag and to aid in volumetric control.

The bag is filled by the positive displacement pump driving product through the coupling tube and through the product delivery tube and into the tubular film. Once the bag reaches a substantially filled condition, the film is indexed by the film directing structure 26.

As the product passes beyond the squeegee rollers, the squeegee rollers are directed toward and into contact with each other. As the film continues to move product is precluded from passing between the squeegees creating a space wherein the two films abut each other and are substantially free of product therebetween. The squeegee rollers additionally assist with the movement of the film as they can be coupled to a servomotor or other motive structure that can impart rotation to the squeegee rollers.

As the top of the product reaches the film sealing assembly 80, the first side mating sealer and the second side mating sealer are directed toward each other. As the two are directed to each other, they eventually force and press the opposing seal contact surfaces into contact with the films on opposing sides so as to sandwich the film therebetween. The sealing mechanisms (heat, RF, ultrasound, among others) is activated and a seal is formed that is generally transverse to the direction of the movement of the tubular film (and in the configurations shown, substantially perpendicular to the movement of the tubular film through the apparatus). The central cutter also cuts between the formed upper and lower portions of the seal so as to separate the now formed bag from the tubular film. In other words, the seal that was formed forms the upper seal of the resulting bag, and, also forms the lower seal of the subsequent bag. The shaping surfaces provide a reinforcement or frame for the bag so that the shape can be maintained during sealing. The bag is then released onto the conveyor (additional rollers or holding structures or movable floors or the like can be utilized to control the release of the formed bag onto the conveyor).

At the same time that the seals are formed, or prior thereto, or subsequent thereto, the next bag is being filled. The squeegee precludes the passage of the product to the lower seal prior to formation, and/or, prior to the seal having the integrity to support the product without failure. At such time, or at a time thereafter, the squeegee rollers are separated and the product passes between the squeegee rollers to the now created bottom seal. The process is then repeated sequentially for each container that is formed.

The speed of the formation can vary depending on a number of different factors, including, but not limited to, the product properties, the size of the bag, the type of seal, the geometry of the bag, the temperature, among other properties. It will further be understood, that, as set forth above, the pump may operate so as to direct product to the bags at different flow rates. For example, the flow rate of product can be reduced when the bag is getting close to the filled condition, or at the very beginning so as to reduce, for example, splashing or the like. In other configurations, the continuous fill can be maintained at a continuous flow rate.

It will be understood that as the squeegee precluded the entry of product or the like, and as air or other gasses did not generally pass the squeegee, head space is eliminated or virtually eliminated in the formed bag, as the product will assume the shape of the bag through known fluid movement.

In the dosing operating mode, a similar procedure is undertaken, however, the squeegee rollers can be used to control the headspace. Specifically, as the first bag is being filled, the cam drive of the positive displacement pump control the movement of product, and once the precise amount of product has been dispensed, the pump can stop so as to have a delivery that may be like the sinusoidal delivery that is disclosed above. As the proper amount of product has been transmitted to the bag, the plunger may return or may be directed to a closed orientation to preclude the passage of fluid therethrough.

The tubular film, with product at the end thereof is indexed so that the product passes the film sealing assembly 80. In a manner as disclosed previously, the sealing assembly can be activated to form the top seal for the bag and the lower seal for the subsequent bag, and to separate the bag from the tubular film. Similarly, the shaping surfaces can provide support for the bag as the upper seal is formed. The bag can then be positioned onto a conveyor (or otherwise caught, moved, transported or the like).

Once the created seal is operational and of sufficient strength so as not to fail or to otherwise impart a degradation to the product, the plunger is opened, and the pump can dispense another dose into the tubular member and the steps can be repeated to form each subsequent bag in series.

As the squeegee may be utilized in some configurations, air or other gasses can enter into the bag below the seal. By controlling the shaping surfaces and the configuration thereof, the product can be pushed upwardly close to the seal prior to the formation thereof so as to minimize any headspace that is created. In other configurations, the squeegees can be utilized in the dosing application so as to minimize headspace.

This dosing system can be utilized and is beneficial for the filling of bags where the product tends to cling or smear along the film, for example, or product that does not otherwise tend to work well with a squeegee, such as products containing particulates among others (of course, the system is not limited to use in association with any type of product, and, the products mentioned are purely exemplary and not to be deemed limiting). One such example is blue cheese dressing and other flowable materials containing substances like blue cheese. When blue cheese passes proximate the squeegee, a bit of the blue cheese passes between the film past the squeegee which can be detrimental to the seal that is formed. In some instances, the seal has sufficient area that is sealed so that integrity is maintained, but portions of the seal are discolored from, for example, burned blue cheese or pockets where the seal was not formed. In other instances, the seal may be fully compromised (which may be both the upper seal of one bag, and the lower seal of the subsequent bag). If the integrity is not maintained, the entire FFS apparatus can be contaminated by leaking packages. Additionally, through the dosing system, improvements can be realized to weight control of each of the packages. That is, in the dosing operating mode, the amount of product that is dispensed into the bags tends to be more consistent from bag to bag than in the continuous operating mode.

Advantageously, while positive displacement pumps are often utilized with FFS apparatuses to fill containers, they are typically not utilized in a dosing setting due to various constraints. Here, the same positive displacement pump is utilized both for the continuous operating mode and for the dosing operating mode, thus, the system may be readily utilized for different types of product, and, for product wherein the effectiveness of the squeegee is severely limited or wherein the use of the squeegee is incompatible with the product. Furthermore, it is contemplated that the plunger can be removed when operating in the continuous operating mode, or the plunger can be maintained in the fully open or open configuration during the entirety of each cycle.

Variations are contemplated to the system, in that, for example, various different positive displacement pumps can be utilized. It is contemplated in the present disclosure, that a positive displacement rotary pump is utilized controlled by a cam drive when in the dosing operating mode, other types of positive displacement pumps can be utilized and may be controlled in manners other than a cam drive. In addition, it is contemplated that the squeegee rollers can be utilized in each of the continuous operating mode and in the dosing operating mode. It is further contemplated that other structures may be altered, such as, for example, the product delivery tube, portions of the bag shaping assembly and the film sealing assembly when utilizing either of the modes of operation or when transferring from one mode of operation to the other.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A method of filling a bag with a product utilizing a form fill seal apparatus comprising the steps of:
   providing a film comprising a polymer;
   manipulating the film into a tubular configuration;
   forming a longitudinal seal on the tubular configuration to form a tubular film;
   forming a first bottom seal at an end of the tubular film;

selecting one of a continuous operating mode and a dosing operating mode;

directing product through a positive displacement pump to a product delivery tube in communication with the tubular film through the selected one of the continuous operating mode and the dosing operating mode;

wherein, in the dosing operating mode, the method further includes the steps of:

in the dosing operating mode, stopping the step of directing upon directing a desired volume of product into the tubular film, directing the tubular film having the product therein beyond a seal forming assembly;

pressing opposing shaping surfaces positioned downstream of the seal forming assembly together against the tubular film and the product to direct the product toward the seal forming assembly, while maintaining the product downstream therefrom, to minimize any air that is within the tubular film downstream of the seal forming assembly;

forming a plurality of transverse seals after initiating the step of pressing, the at least one transverse seal formed upstream of the product, and proximate a region of the film that did not have product contact thereby minimizing a headspace that is created by air that is within the tubular film downstream of the seal forming assembly, resulting in a sealed and filled bag; and cutting the tubular film after forming a pair of transverse seals to separate the sealed and filled bag; and wherein, in the continuous operating mode, the method further includes the steps of:

directing opposing squeegees into contact with the tubular film sandwiching the tubular film therebetween after the step of directing product; and moving the tubular film past the squeegees to displace product with the tubular film;

forming a plurality of transverse seals over a portion of the tubular film wherein product has been displaced by the squeegees to form the sealed and filled bag;

cutting the tubular film after forming a pair of transverse seals to separate the sealed and filled bag.

2. The method of claim 1 wherein in the continuous operating mode, the positive displacement pump has a plurality of speeds.

3. The method of claim 1 wherein in the dosing operating mode, the directing of product is based upon volume.

4. The method of claim 1 wherein the transverse seals are formed through any one of heat seals, RF welding and ultrasonic welding.

5. The method of claim 1 wherein in the dosing operating mode, the positive displacement pump has a sinusoidal speed profile.

6. The method of claim 1 wherein, in the dosing operating mode, a successive weight of filled bags has a closer range of weights as compared to a successive weight of filled bags in a continuous operating mode.

7. The method of claim 1 wherein the product delivery tube includes a second end having a plunger movably positionable to selectively preclude passage of product through the product delivery tube.

8. The method of claim 1 wherein the product comprises a blue cheese dressing.

* * * * *